United States Patent [19]

Buehrle

[11] 4,230,989

[45] Oct. 28, 1980

[54] COMMUNICATIONS SYSTEM WITH REPEATER STATIONS

[75] Inventor: William B. Buehrle, Phoenix, Ariz.

[73] Assignee: Engineered Systems, Inc., Tempe, Ariz.

[21] Appl. No.: 37,657

[22] Filed: May 11, 1979

[51] Int. Cl.² .............................................. H04B 7/14
[52] U.S. Cl. ........................................ 375/4; 375/58; 375/121
[58] Field of Search ........................... 325/1, 4, 6, 55; 179/15 AL; 343/6.5 R, 6.8 R

[56] References Cited

U.S. PATENT DOCUMENTS

| 3,955,140 | 5/1976  | Stephens  | 325/4     |
|-----------|---------|-----------|-----------|
| 4,016,369 | 4/1977  | Pedersen  | 179/15 AL |
| 4,056,780 | 11/1977 | Faulkner  | 325/5     |

OTHER PUBLICATIONS

*Communication Engineering*, "Using Radio Links and Relays," pp. 15-17, vol. 14, No. 1, Jan./Feb. 1954.

*Primary Examiner*—Harold I. Pitts
*Attorney, Agent, or Firm*—Lavalle D. Ptak

[57] ABSTRACT

A radio communication system includes a polling central station and a number of remote stations. Each remote station is identified by a unique address transmitted from the central station preceding a message intended for such remote station. Each of the remote stations also may be programmed to respond to the address of a "partner" station in addition to responding to its own address. The "partner" station address is employed whenever one of the remote stations is located such that a transmission link problem exists between such station and the central station polling station. When this condition exists, the station which has difficulty communicating directly with the central station is provided with a new address and no longer is responsive to the address of messages transmitted to it from the central station. Another remote station, having a better communications link between it and the central station, then is optionally programmed to respond to the address of its "partner" station and translates that address to the new address, which precedes the relaying or retransmission of the message to the partner station. Similarly, messages from the partner station are transmitted to the relaying station, preceded by the new address and the relaying station translates the new address to the original or normal address of the partner station for retransmission to the central polling station. Thus, different ones of the remote stations optionally may be used as relaying stations as needed in the implementation of the system, without requiring any changes whatsoever in the operation of the central polling station.

8 Claims, 2 Drawing Figures

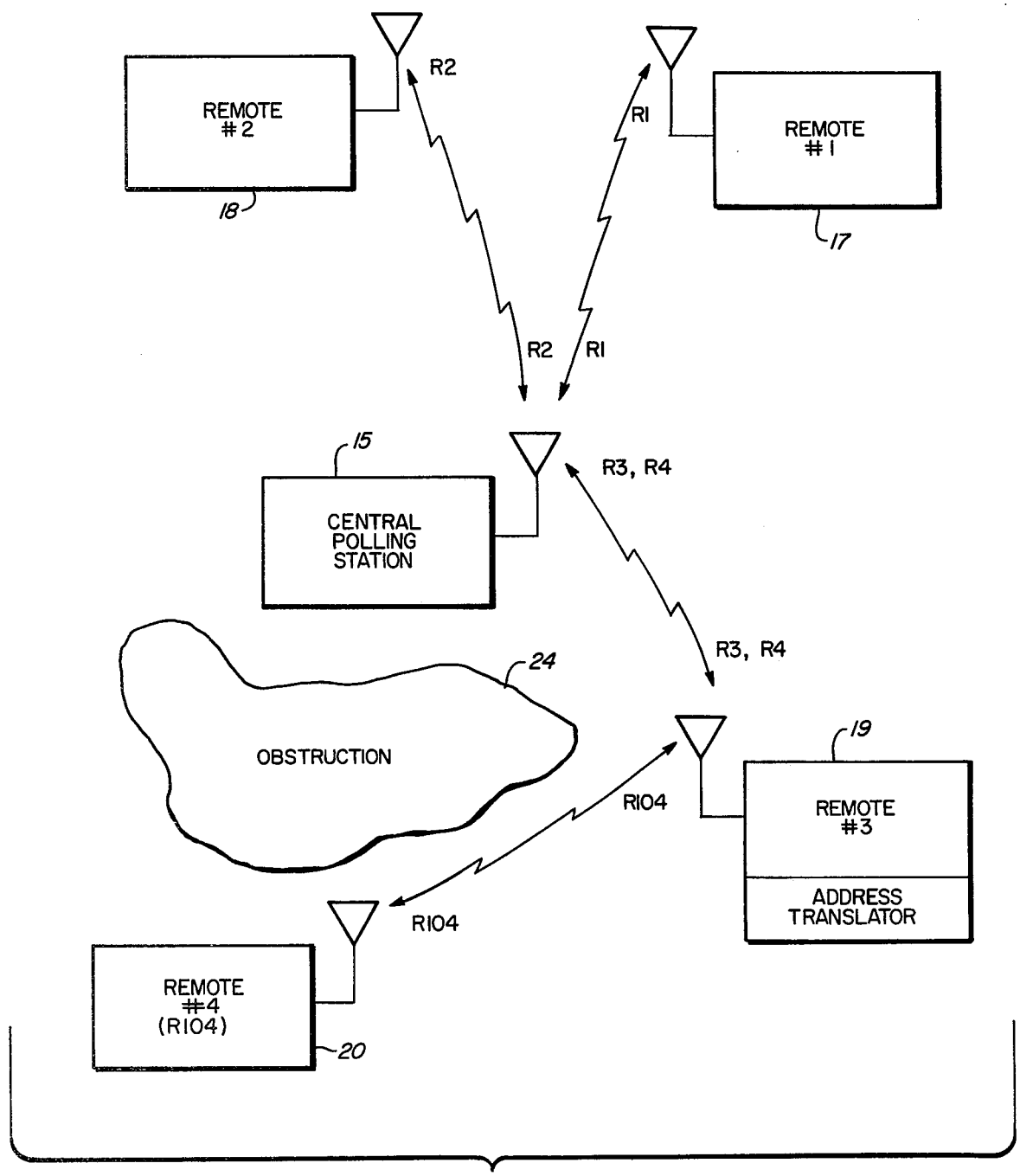

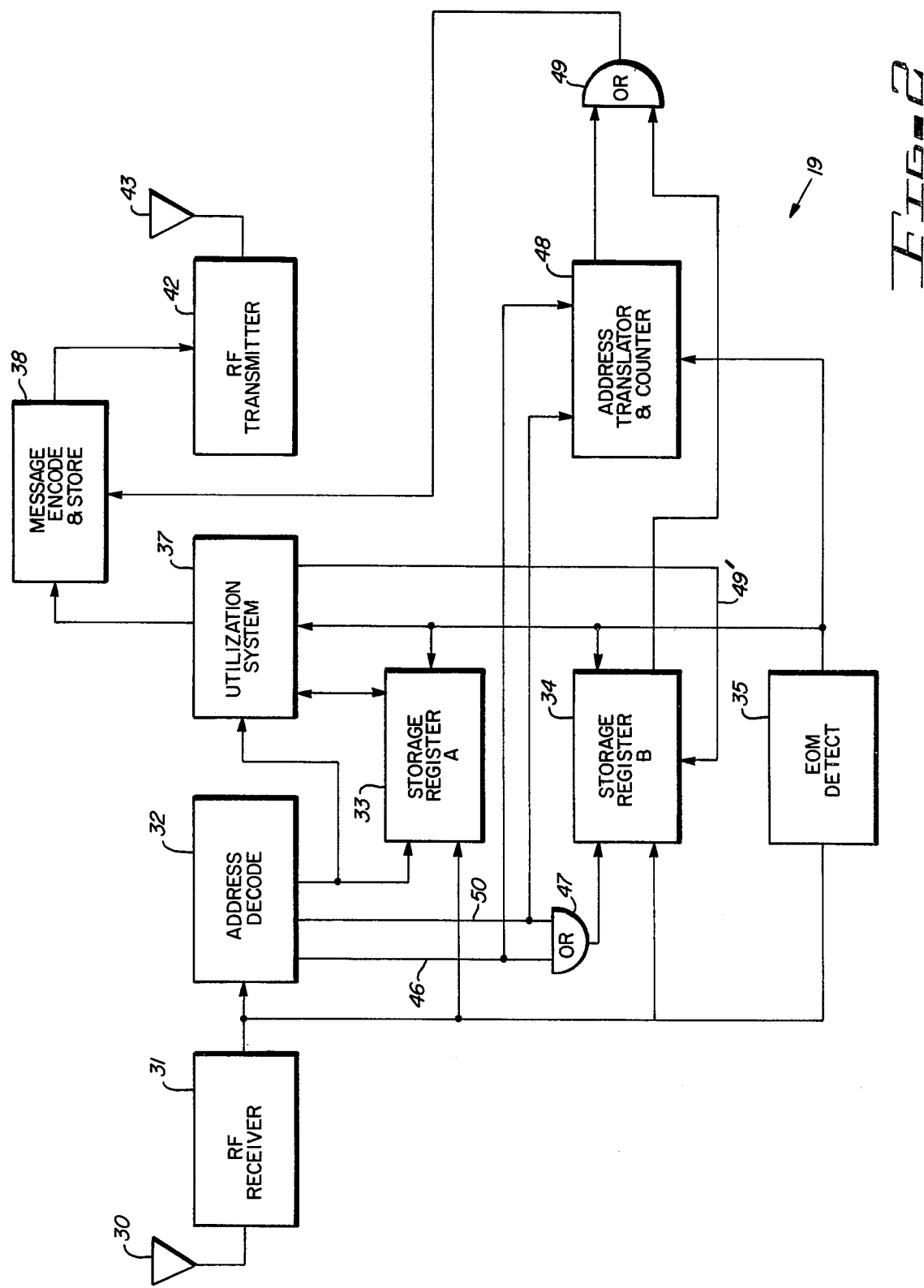

COMMUNICATIONS SYSTEM WITH REPEATER STATIONS

BACKGROUND OF THE INVENTION

A large number of applications exist for a communications system where a central station periodically polls different ones of a number of outlying or remote receive/transmit stations for the purpose of supplying information to one or more of the outlying stations and for obtaining data from the outlying stations in response to a request for such data. Such systems are commonly known as "Polling" systems, and the messages directed to each of the remote stations are preceded by a unique address specifically identifying the station to which the following message is directed. Generally, at the end of each message, an end-of-message or end-of-transmission coded signal is sent to notify the receiving station, and all other stations on the system, that the particular message is terminated. Upon the termination of one message intended for one or more stations another message addressed to a different station or stations then is transmitted from the central station. Systems of this type often additionally include a transmission of the addresses of the various remote stations from the central polling station to initiate the transmission of desired data from the remote stations back to the central station. Upon receipt of its unique address, the remote station which has been polled by the central station then transmits data to the central station.

Such systems often are used for periodically monitoring remote unattended data collection stations, such as weather monitoring stations, remote pumping stations, and the like. In some situations, the remote stations are located in rugged terrain where one or more of the remote stations may be located relative to the central polling station such that radio communications obstruction is located in the transmission path between the remote station and the central polling station. Typically, obstructions are natural obstructions, such as mountains, or man made obstructions, such as high tension electrical lines and the like. In any event, the obstructions often make the communications path between the polling station and the remote station unreliable. In many situations, where a central polling station is located so that it has a clear radio communications path with all of the remote stations, subsequently-erected man-made structures may create a radio communications obstruction which did not originally exist when the system first was implemented.

In the past, it has been the practice, when a reliable direct communications link between the central polling station and one or more remote stations could not be maintained, to utilize specially constructed repeater stations located on the tops of hills or mountains or on top of tall buildings. These repeater stations are positioned so that a clear communications path exists between the central polling station and the repeater and between the remote station and the repeater. Repeater stations, particularly active repeater stations, are expensive since they must be separately and differently constructed apart from the central and remote stations in the system. Furthermore, particularly in the case of repeater stations located in rugged mountainous terrain, maintenance of such station is an additional ongoing added expense in the system with which they are used.

It is desirable to provide an inexpensive and flexible system for relaying or repeating messages for remote stations in a polling system whenever the direct communications link between a given remote station and the central polling station is unreliable.

SUMMARY OF THE INVENTION

Accordingly, it is an object of this invention to provide an improved communications system.

It is another object of this invention to provide an improved polling communications system.

It is additional object of this invention to provide an improved communications network in which different stations in the network selectively may be programmed to operate as repeaters for messages intended for other stations in the system.

It is a further object of this invention to provide a repeater station capability for any one of a number of remote stations in a polling system network which may be utilized whenever the direct communications link between the central polling station and a given remote station becomes unreliable.

It is still another object of this invention to provide a pseudo repeater capability in a communications system, having a central polling station for selectively communicating with a number of remote stations in response to uniquely transmitted addresses, in which each of the remote stations may be individually programmed to operate as a repeater for a specific one of the other remote stations in the event the communications link between the central polling station and such other remote stations become unreliable.

In accordance with a preferred embodiment of this invention, a radio communications system includes a central polling station and at least first and second remote stations. Each of the remote stations responds to messages preceded by a different unique address and the central station transmits messages preceded by addresses uniquely identifying the remote stations. At least the first remote station includes means for responding to a decoding the address of the second remote station and means for translating the address for the second remote station to a new address. The second remote station then is adjusted to respond only to the new address which is relayed to it along with its associated message from the first remote station. Whenever the second remote station is adjusted to respond to the new address, it is rendered non-responsive to its normal address as transmitted from the central station. No changes are necessary at the central station which functions as if a conventional polling system network operation were in effect.

In a more specific embodiment of the invention, each of the remote stations is capable of transmitting messages back to the central station, preceded by the address identification of the remote station. The first remote station, however, is adjusted to respond to the new address of the second remote station and receives and stores that address along with its associated message. Subsequently, the new address is converted back to the normal address for the second remote station; and the message from the second remote station is retransmitted from the first remote station to the central station which receives it in the same manner as if the message had been transmitted directly to the central station from the second remote station.

BRIEF DESCRIPTION OF THE DRAWINGS

FIG. 1 illustrates a radio communications network including a central polling station and several remote stations modified in accordance with a preferred embodiment of the invention; and FIG. 2 is a block diagram of a preferred embodiment of the system used at a remote station.

DETAILED DESCRIPTION

Reference now should be made to FIG. 1 which illustrates, diagrammatically in a block diagram form the geographical distribution of a central station and four different remote stations in a radio commuications polling system. The system typically is one which may be used for data acquisition for electrical distribution networks, data acquisition and control for irrigation canal systems or electrical distribution systems and the like. In such systems it often is necessary to monitor and/or control the operation of remotely located sub stations in the systems. Frequently the remotely controlled stations are in geographical locations which are difficult to reach. In addition most of these remote stations are unattended, or at least for the purposes of the monitoring and/or control functions, no attendance by human operators is necessary during the normal operation of the systems.

Central station controlled polling systems of the general type shown in FIG. 1 are known. Generally a central polling station such as the polling station 15 of FIG. 1 sequentially polls the remote or outlying stations on a party line basis in some pre-established sequence to supply data to and receive data from those outlying stations. Typically, the data is encoded in the form of binary-encoded characters transmitted on a radio frequency carrier by means of frequency shift keying signals. The particular transmission techniques used are not important to an understanding of the preferred imbodiment of the invention disclosed.

In order to uniquely identify the particular one or ones of the remote stations to which a message is directed or from which information is desired by the central polling station 15, each message transmitted from the polling station to the remote stations is preceded by an address or addresses uniquely identifying the station or stations to which that message is directed. The remote stations 17, 18, 19 and 20 identified as remote stations Nos. 1, 2, 3, and 4, respectively, each are programmed to respond to their own unique address. In a system which has been commercially implemented, the first character of each message is a prefix frame which is used to identify a start-of-message at all of the remote stations. This character also serves as a fail safe check for all of the encoding and decoding logic at the various remote stations 17 to 20. The second character is encoded to specifically identify a particular one of the remote stations 17 to 20. In addition, in accordance with well known polling communication system techniques, a provision also may be made for a "group" address if a message is intended to be received by and acted upon by more than one or all of the remote stations. In such an event, the remote stations simply are programmed to respond to an additional group address in accordance with the specific requirements of the polling system.

In systems of the type shown in FIG. 1, the central polling station 15 usually is located so that it is within receiving and transmission range of all of the remote stations employed in the system. Frequently, however, one or more of the remote stations is located in a position where there is a radio frequency obstruction, indicated in FIG. 1 by the mountain 24, between that remote station and the central polling station.

In FIG. 1, the mountain 24 is indicated as creating interference or an obstruction between the transmitting and receiving antennas of the central polling station 15 and the remote station 20 (#4). As a consequence, the communications link directly between these two stations is subject to considerable interference; and unreliable communications exist between the polling station 15 and the remote station 20. There is no communications problem between the central polling station 15 and the other remote stations 17, 18, and 19. In accordance with a preferred embodiment of this invention, the various remote stations 17 to 20, and at least the remote station 19, are provided with a capability of additionally responding to the address of another "partner" remote station, having an unreliable communications link between it and the central polling station 15, and storing data and forwarding data for the "partner" station preceded by a translated "new" address. The remote "partner" station to which this data is retransmitted is programmed to respond only to the "new" address and is made nonresponsive to its normal address, as originally transmitted from the central polling station 15. No change whatsoever is made in the central polling station 15 insofar as the transmission and reception of data from the remote stations in the system is concerned.

All of the remote stations 17, 18, 19, and 20 shown in FIG. 1 are capable of receiving data from the central polling station 15 and additionally include a transmitter section for transmitting data to the central station 15 or to a "partner" station, in the event one or more of the stations are used to translate addresses intended for a different remote station for retransmission to such different remote station, as in the case of the remote stations 19 and 20 shown in FIG. 1.

Before entering into a more detailed description of the operation of the remote stations for accomplishing this address translation function, a brief description of the operation of the polling system shown in FIG. 1 first is considered helpful. As shown in FIG. 1, there is a two-way radio communications link between each of the various remote stations 17 to 20 and the central polling station 15. Communications received by the central polling station 15, in response to polling signal requests for data, are transmitted to the polling station 15 preceded by the address of the remote station transmitting such data. All transmissions in the system are preceded by a first prefix or start-of-message character and are terminated by a fixed end-of-message or end-of-transmission character. In each case, the addresses transmitted from and received by the central polling station 15 are preselected addresses of the type commonly used in such polling systems. For the purposes of illustration in FIG. 1, these addresses are simply identified as R1, R2, R3, and R4 corresponding to the addresses of the four remote stations 17 to 20 respectively. Thus, whenever the central polling station 15 desires to communicate with remote station 17, the message is preceded with address "R1" designating the remote station 17. When this address is decoded, only the remote station 17 responds to the subsequent message transmission for whatever action is to be taken by that remote station. The remote stations 18, 19 and 20 are nonresponsive since their address decoding sections do not decode address "R1." At the end of message or end of transmission, all of the stations once again are rendered responsive to the party line signals to await receipt of the next address. Thus, if the next message is to go to the remote station 18 or to the remote station 19, the appropriate address "R2" or "R3" is transmitted and the station 18 or 19 responds in the same manner described above for station 17.

Because of the mountain 24, the transmission between the central polling station 15 and the remote station 20 (R4) is unreliable. Consequently, the address decoding circuit of the remote station 20 is programmed to respond to a "new" address, R104, instead of its conventional or normal address R4. Thus, even if a clear transmission path should exist through some unusual circumstance of weather or the like, the remote station 20 does not respond to the address "R4" transmitted to it from the central polling station 15. No change is made at the central polling station 15 from a conventional polling system.

A modification, however, is made in the remote station 19, since this station is the one nearest the remote station 20, and is one which has a clear transmission path to the remote station 20 as illustrated in FIG. 1. The remote station 19 is programmed to respond to both its own address, R3, and the address, R4, of messages intended for the remote station 20. In response to its own address R3, the remote station 19 operates in the same manner as any of the other remote stations to act upon the message data following such address in whatever manner is appropriate in the particular system of which the station 19 is a part. In addition, when messages preceded by the address R4 for the remote station 20 are received by station 19, the address R4 is translated to the new address R104 by the station 19; and the message intended for the station 20 which follows the address R4 as transmitted from the central polling station 15 is temporarily stored by the remote station 19. At the end of that message, as determined by the appropriate end-of-message character or sequence of characters the remote station 19 automatically retransmits the message intended for its "partner" station 20 but precedes the transmission of this message data by the translated new address R104. Since the station 20 is programmed to respond only to messages sent to it preceded by the new address R104, the station 20 responds to the receipt of the address and the following message data in the same manner as if it had been transmitted directly to the station 20 from the central polling station 15.

In the system of FIG. 1, all of the remote stations also are provided with a capability of transmitting data back to the central polling station either on a regular basis or in response to a polling sequence requesting the transmission of such data as controlled by the central polling station 15. With respect to the remote stations 17, 18, and 19, the data transmitted from these stations to the central polling station 15 is preceded by the identifying address for the stations R1, R2 and R3 in a conventional manner well known in the art. The remote station 20 however precedes the transmission of its data with the new address R104. The remote station 19 is provided with a decoding section responsive to this address to store messages following the address R104 for subsequent retransmission to the central polling station 15. Those messages then are retransmitted by the remote station 19, but the address 104 is again translated by the address translator section of the remote station 19 to the original or normal address R4, which then precedes the retransmission of the data to the central polling station 15.

The central polling station 15 is not modified in any way and operates as if no repeating or address translation were taking place anywhere in the system. In fact, if a man-made obstruction should be erected anywhere in the system subsequent to its original installation which would make the transmission link between the central polling station 15 and any one of the other remote stations 17, 18, and 19 unreliable, a similar "partner" station relationship then may be established between two of the other remote stations to operate in the same manner as described above in conjunction with the remote stations 19 and 20. Ideally all of the remote stations 17, 18, 19, and 20 are provided with the capability of responding to and translating addresses for at least one other "partner" station; so that the system retains a maximum effectiveness even though obstructions to good radio frequency communications links between one or more of those stations and the central polling station 15 subsequently arrive at any time during the life of the system.

Reference now should be made to FIG. 2 where the remote station 19 is shown in greater detail for the purpose of describing the manner in which the system of the remote station 19 (which simply is chosen for the purposes of illustration since all of the remote stations 17, 18, 19 and 20 are identical) operates to implement the system functions described above in conjunction with FIG. 1.

Radio frequency signals from the central polling station 15 are received on a conventional antenna 30 at the remote station (station 19 in the present example) and are applied to a standard RF receiver circuit 31, the output of which constitutes binary message character information (either in serial form or parallel form as desired in the system). The manner in which this is accomplished is known in the art, and the details are not important to an understanding of this invention. The received signals are applied in parallel to four different circuits, namely, an address decoder circuit 32, a first storage register 33, a second storage register 34, and an end-of-message or end-of-transmission detector circuit 35.

When the first character of a message transmission is first received, the registers 33 and 34 and the end-of-message detector circuit 35 are essentially non responsive. The address decoder circuit 32 monitors the address signals received after the start-of-message character. The address decoder circuit 32 includes logic gate implementation or microprocessor programmed implementation to respond to the unique address of station 19, as illustrated in FIG. 2. If the address decoder circuit 32 decodes the address for the station 19 with which it is used, it enables the storage register 33 to temporarily store the message characters following that address and preceding the next end of message character. Upon detection of the end-of-message character, the circuit 35 produces an output pulse which is applied to the storage register 33 and to a utilization circuit 37 to terminate the further storage of information in the register 33 and to enable the utilization system 37 for operation. During this sequence of operation, the storage register 34 was not enabled and so there is no affect upon its operation upon the receipt of the end of message detection pulse from the circuit 35.

At the time the address decoding circuit 32 decodes the address for remote station 19 (address R3), the output also is used to enable the utilization system 37 for appropriate operation. The specific manner in which the decoded address is used in any given system to initiate any operation in the system may vary from system to system, and it is not important to an understanding of the address translation and psuedo repeater function of the system comprising the preferred embodiment of the invention disclosed in FIG. 2.

When the end-of-message pulse is applied from the circuit 35 to the storage register 33 and the utilization system 37, the utilization system 37 then is enabled to act in response to the message received. For example, the received message may be in the form of binary encoded control data for controlling the operation of various valves if the system is used in a water or fuel pipeline supply system. If the message stored in the register 33 is one which indicates that data is to be transmitted from the remote station 19 back to the transmitter, the utilization system 37 produces an output to a message encoding and storage circuit 38 which includes monitoring and encoding equipment for providing data indicative of the operation of the various equipment at the remote station. This information then is supplied to an RF transmitter 42 which transmits the data from the remote station 19, preceded by its address R3 over a transmitting antenna 43 back to the central polling station 15. Transmission from the remote stations, in a commercial version of the system, is at the same carrier frequency and uses the same frequency shift keyed frequencies as are transmitted by the central polling station 15 to the various remote stations. If full duplex transmission is desired, that also readily may be implemented in the system without any change in the underlying system operation concept.

The description of operation of the system given above for receipt of the normal address for a station and for the transmission of information from a remote station to the central station 15 when a good communications link exists between the stations is conventional and is one which is used widely in polling communications systems. In addition, however, the address decoding circuit 32 of each of the stations, and particularly of station 19 shown in FIG. 2, is provided with a second section which responds to and decodes the address for its "partner" station. In the example in FIG. 1, the station 20 is a "partner" station to the station 19. Thus the station 19 shown in FIG. 2 also includes a section in its address decoding circuitry for decoding and responding to the addresses of the remote station 20 (address R4).

When address R4 is received, an output is applied from the appropriate section of the decoding circuit 32 over a lead 46 to enable the storage register 34 to receive the subsequent message and temporarily to store it. At the same time, an address translater and counter circuit 48 is enabled to sequentially supply, from a preprogrammed memory a new address R104 through an or gate 49 to the message and encoding storage circuit 38 of the system. When the end-of-message sequence is detected, further storage of information is terminated by the pulse applied from the output of the message detection circuit 35 to the storage register 34. At the same time, the address translater and counter circuit 48 is reset to prepare it for another cycle of operation.

The output pulse supplied from the end-of-message detector 35 to the utilization circuit 37 causes the circuit 37 to pass an enabling signal to the message encoding and storing circuit 38. This initiates the transfer of the translated address followed by the message characters temporarily stored in the storage register 34 to the circuit 38 under control of clock pulses applied to it over a lead 49 from the utilization system 37. These characters are passed through the or gate 49 to the circuit 38.

The translated address R104, followed by the appropriate message, then is supplied from the RF transmitter 42 through the antenna 43 to the remote receiver 20. The remote receiver 20 has its address decoding circuit 32 encoded to respond to the new address R104, and it is rendered nonresponsive to the address R4, as explained above; so that the message received by the remote station 20 from its "partner" station 19 is received and processed in the same manner as if it had been supplied directly to the station 20 from the central polling station 15.

Because the transmission link between the central polling station and the remote station 20 is unreliable in both directions, the remote station 20 transmits data intended for the central polling station 15 preceded by the translated address 104 also. The central polling station 15 does not respond to this address but a third section in the address decoder circuit 32 of the station 19 or the software implementation of microprocessor controlled circuitry responds to receipt of this address R104 from the receiver 31 and decodes it. When the address R104 is decoded by the address decoder circuit 32, signals are supplied over a lead 50 through the or gate 47 to the storage register 34 to enable the storage register 34 for operation to store the following message. At the same time, a second section of the address translater and counter circuit 48 is enabled to translate, from storage in a different section of the circuit 48, the address R104 back to the original address R4, corresponding to the remote station 20. This information is supplied through the or gate 49 to the message encoder and storage circuit 38 in the manner described previously. Once again, when an end-of-message character is detected, an output pulse is applied from the circuit 35 to reset the translater and counter circuit 48 and to terminate the further storage of information in the storage register 34.

At the end of message as detected by the circuit 35, the utilization system 37 applies clock signals over the lead 49 to the register 34 to effect the transfer of the data stored therein through the or gate 49 back to the message encoding and storage circuit 38. From this circuit, the message transmitted by the RF transmitter circuit 42 over the antenna 43 preceded by the address R4 (translated from the new address R104 back to the original address R4) to the central polling station 15, as if the information had originated directly from the remote station 20 without being stored, translated, and retransmitted. This incorporation of the "partner" concept between different ones of the remote stations may be effected at any time it becomes necessary without making any changes whatsoever in the central polling station 15.

From the foregoing, it is apparent that the different remote stations 17, 18, 19 and 20 readily can be modified, simply by providing the address decoding capability in the address decode circuits 32 and by providing the additional storage register 34, to operate as a psuedo repeater for messages intended for one or more other stations in the system. Although the foregoing description has been limited to a single "partner" station for each remote station, it will be apparent to those skilled in the art that the capabilities of using any one of the stations as a pseudo repeater for more than one other station can be accomplished simply by increasing the number of different addresses which may be decoded by the circuit 32. In addition, it will be apparent to those skilled in the art that for some applications a remote station may be used solely as a repeater station, without incorporating the various other aspects of the system for control functions or for monitoring functions, as described in conjunction with the circuit of FIG. 2. This of course would be at the option of the user of the system.

The system which has been shown in the drawings and described above should be considered as illustrative only of the invention, and it is not to be considered limiting. Various other modifications and changes will occur to those skilled in the art without departing from the true scope of the invention.

I claim:

1. A radio communications system including a central station and at least first and second remote stations, said central station transmitting messages each preceded by a unique address to said first and second remote stations, said system including in combination:

first and second remote stations;

said first remote station having receiving means for receiving messages from said central station and including means for decoding a first unique address for operating utilization means at said first remote station in response to receipt and decoding of such first address, said first station also having means for decoding a second unique address for said second remote station and translating said second address to a new address for said second remote station, said first remote station including means for transmitting said new address followed by messages received by said first remote station and originally preceded by said second address to said second remote station; and means for causing said second remote station to be responsive to said new address for operating utilization means to said second remote station and for rendering said second remote station nonresponsive to said second address transmitted from said central station.

2. The combination according to claim 1 further including transmitting means at said first and second remote stations wherein said second remote station transmits messages preceded by said new address to said first remote station which responds thereto and translates said new address to said second address for retransmission of messages preceded by such address to the central station.

3. The combination according to claim 1 wherein said first and second remote stations are part of a plurality of remote stations, each of which is programmed to respond to messages from the central station preceded by a unique address individual to each of said remote stations, and each of said remote stations further optionally responds to the address of at least one other remote station as individually selected at said remote station for translating the address of such one other remote station to a new address; and whereby such one other remote station responds only to said new address for receipt of retransmitted messages supplied to it from said address translating remote stations.

4. The combination according to claim 3 wherein each of said remote stations includes means for transmitting information preceded by the unique address for such remote station to the central station; and said second remote station transmits messages preceded by said new address to said first remote station which translates said new address to said second address followed by retransmission of originally preceded by said new address to the central station.

5. A radio communications system including a central station and at least first and second remote stations, said central station transmitting messages each preceded by a unique address to said remote stations, said system including in combination:

receiving means at said first remote station for receiving messages from said central station and including means for responding to and decoding a unique address identifying messages intended for said second remote station and translating said second address to a new address for said second remote station;

transmitting means at said first remote station for transmitting, to said second remote station, said new address followed by a message received by said first station and originally preceded by said second address; and means at said second remote station causing said remote station to be responsive to said new address for operating utilization means at said second remote station and for rendering said second remote station nonresponsive to said second address transmitted from said central station.

6. The combination according to claim 5 further including transmitting means at said first and second remote stations wherein said second remote station transmits messages preceded by said new address to said first remote station which responds thereto and translates said new address to said second address for retransmission of messages preceded by such second address to the central station.

7. The combination according to claim 5 wherein said first and second remote stations are part of a plurality of remote stations, at least some of which are programmed to respond to messages from the central station preceded by a unique address individual to each such remote station, and at least others of which further optionally respond to the address of at least one other partner remote station for translating the address of such one other remote station to a new address; and whereby said one other remote station responds only to said new address for receipt of retransmitted messages supplied to it from said address translating remote station.

8. The combination according to claim 7 wherein each of said remote stations includes means for transmitting information preceded by the unique address for such remote station to the central station; and said second remote station transmits messages preceded by said new address to said first remote station which translates said new address to said second address followed by retransmission of messages originally preceded by said new address to the central station.

* * * * *